United States Patent Office

3,767,634
Patented Oct. 23, 1973

3,767,634
**COPOLYMERIZATION OF CHLOROTRIFLUORO-
ETHYLENE AND ETHYLENE USING A REDOX
CATALYST**
Lacey E. Scoggins, Bartlesville, Okla., assignor to
Phillips Petroleum Company
No Drawing. Filed Dec. 15, 1971, Ser. No. 208,406
Int. Cl. C08f 1/62
U.S. Cl. 260—87.5 A          10 Claims

ABSTRACT OF THE DISCLOSURE

An efficient process for the copolymerization of chlorotrifluoroethylene and ethylene is provided by contacting a mixture of the monomers in an aqueous system with a redox catalyst system comprising a persulfate oxidizing agent, an ammonium or alkali metal sulfur-containing salt reducing agent, and a buffering agent. A preferred catalyst system is a mixture of potassium persulfate, sodium bisulfite, and sodium tetraborate.

BACKGROUND OF THE INVENTION

Field of the invention

This invention relates to the preparation of copolymers of ethylene and chlorotrifluoroethylene.

Description of the prior art

The preparation of copolymers of ethylene and chlorotrifluoroethylene (CTFE) is described by Hanford in U.S. Pat. 2,392,378 issued Jan. 8, 1946. These polymers are related to the homopolymer polychlorotrifluoroethylene available as an item of commerce, and of course, the well known polytetrafluoroethylene.

Copolymers of ethylene and chlorotrifluoroethylene exhibit properties which include high strength and resistance to chemicals and weathering. They are nonflammable and have good electrical properties. They generally possess less thermal stability than polytetrafluoroethylene and they are especially suitable for molding and other operations in conventional plastics fabrication units.

Homopolymers of CTFE are useful as plastics, soluble resins, elastomers, oils, waxes and greases. Industrial uses of homopolymers of CTFE are in areas where its excellent chemical resistance, mechanical strength, cryogenic properties and good electrical insulating properties can be used. In certain of the above applications, the copolymers of ethylene and CTFE exhibit properties which provide a more suitable polymer than polychlorotrifluoroethylene or polytetrafluoroethylene. Accordingly, even though the cost of the copolymer is generally greater, its use in the market place can be expected to expand. Consequently, manufacturers of fluoro-polymers are seeking more efficient methods of preparing the ethylene-CTFE copolymers.

OBJECTS OF THE INVENTION

It is an object of this invention to provide copolymers of ethylene and chlorotrifluoroethylene. Other objects and advantages of the invention will be apparent to those skilled in the art from the following summary of the invention, detailed description of the invention and claims.

SUMMARY OF THE INVENTION

I have discovered that ethylene-chlorotrifluoroethylene copolymers can be efficiently prepared by contacting a mixture of the monomers in an aqueous system with a redox catalyst comprising a persulfate oxidizing agent, an ammonium or alkali metal sulfur-containing salt reducing agent and a sufficient amount of a water soluble buffer to maintain the pH of the reaction mixture above 7 to about 12.

DETAILED DESCRIPTION OF THE INVENTION

The polymers produced according to my invention are characterized in that they can contain from 5 to 95 weight percent of ethylene based on the total weight of CTFE and ethylene present in the polymer. Generally, the amount of ethylene in the polymer can be adjusted by a corresponding increase or decrease in the ethylene pressure in the reaction zone. Those polymers having less than 19.4 weight percent (50 mol percent) of ethylene exhibit the chemical inertness which is characteristic of polychlorotrifluoroethylene. The physical properties such as tensile strength, elongation, flexural modulus, Izod impact and weather resistance of the inventive copolymers containing from about 15 to about 23 weight percent ethylene are superior to those of polychlorotrifluoroethylene.

The catalyst used in my process is a redox couple employed in an aqueous system. The redox couple comprises an oxidizing agent and a reducing agent.

The oxidizing agents used in my catalyst are water soluble peroxy compounds, that is, those compounds which contain an oxygen to oxygen linkage. Alkali metal and alkaline earth metal water soluble salts of persulfuric acid are generally preferred, such as the salts of sodium, potassium and barium. The ammonia salts of persulfuric acid can also be used. Salts such as ammonium $[(NH_4)_2S_2O_8]$ and potassium persulfate $(K_2S_2O_8)$ are generally preferred because of their high activity at low temperature, availability, and low cost.

The amount of oxidizing agent employed is generally about 0.05 to 10 parts by weight based on 100 parts of CTFE monomer charged and preferably 0.10 to 0.30 part thereof.

The reducing agents employed in my process include ammonium and alkali metal sulfur-containing salts such as the sulfites, thiosulfates, bisulfites, hydrosulfites of ammonia, sodium, potassium, rubidium, and cesium. Of these the sodium and potassium salts are generally preferred because of good activity and lower cost. Especially good results have been obtained using sodium bisulfite $(NaHSO_3)$.

The oxidizing and reducing agents generally are employed in stoichiometric amounts. An excess of the reducing agent can be employed if desired, but the excess amount is generally not greater than 30 weight percent of the stoichiometric amount. Thus, the amount of reducing agent employed, based on total monomers, is in the same range as set forth above for the oxidizing agent.

The buffer employed in the catalyst system used in my invention is any water soluble compound which in the presence of the redox couple catalyst system maintains the pH of the reaction mixture above 7 to about 12. Preferably, the reaction mixture is buffered to a pH having a value from about 8 to 11. Examples of suitable buffers include sodium carbonate, sodium acetate, disodium phosphate, sodium citrate, sodium benzoate, sodium tartrate, sodium bicarbonate, ammonium hydroxide, sodium tetraborate, and the like. When using a redox system of $K_2S_2O_8/NaHSO_3$, sodium tetraborate has been found to be especially suitable.

The amount of water employed in the process will be sufficient to maintain an aqueous suspension of the reactant monomers and catalyst system. It usually is convenient to employ from about 25 to about 750 parts by weight of water per 100 parts of CTFE monomer charged to the reaction zone. Especially good results are achieved with water in the range of about 300 to about 500 parts per 100 parts of CTFE.

The polymerization reaction is readily conducted by charging to a suitable sealed reactor the buffer compound and oxidizing agent. These components of the catalyst can be charged neat, or preferably, they are charged as suitable aqueous solutions, for example at a concentration of about 5–15% of the salts in water. The chlorotrifluoroethylene monomer is then charged followed by the addition of suitable amounts of water. Ethylene is then introduced to the reactor under pressure conditions adjusted to provide the desired amount of ethylene in the resulting polymer product. The reducing agent is then introduced, preferably as an aqueous solution of the salt, followed by the addition of the final amount of water needed to satisfy the total amount of water as described above.

The polymerization occurs readily. Indeed, one advantage of the present invention is that high yields of polymer are obtained based on the amount of catalyst employed. For example, I have achieved yields as high as 460 g. of polymer/g. of $K_2S_2O_8$ when using this catalyst system.

The temperature in the reactor should be maintained between about 0° and about 150° C., preferably about 20° to about 60° C. The catalyst and monomers should be maintained, prior to polymerization and during polymerization, in the absence of materials which tend to deactivate the catalyst during use, for example, free oxygen. Thus, the water employed in the reaction should be deoxygenated prior to use. The reaction time should be sufficient to allow the copolymer to form. Generally, reaction times on the order of 0.1 to 24 hours can be employed, but a time of from about 1 to 8 hours is generally sufficient.

As previously mentioned, the amount of ethylene incorporated into the copolymer is generally dependent on ethylene pressure. Thus, as pressure is increased, the amount of ethylene incorporated into the polymer is increased. The ethylene pressure can be varied from about 200 to 1000 p.s.i.g. at initiation of the reaction. However, it is preferred to prepare the polymer by feeding ethylene as demanded to maintain a pressure in the range of from 250–500 p.s.i.g. Within these ranges, the amount of ethylene incorporated into the polymer will be dependent on the selected pressure.

The molecular weight of the resulting polymer is generally in the range of from about 50,000 to about 250,000, but higher and lower molecular weights are possible. The use of lower temperatures in the range of from 20°–60° C. favors the preparation of higher molecular weight polymers. The polymers exhibit excellent molding characteristics and can be suitably molded into various items of commerce such as sheets, films, containers, and the like.

The polymer can easily be easily separated from the aqueous reaction media by filtration. The addition of a suitable agent to coagulate the polymer as discrete particles after the reaction has been completed can be used to aid the filtration operation. Calcium nitrate is especially preferred for this purpose, although other coagulating agents can be employed, as for example, calcium carbonate, gelatin, methanol, and poly(vinyl alcohol). The amount of coagulating agent used in this manner is an amount just sufficient to coagulate the polymer. Excessive amounts should be avoided to prevent contamination of the copolymer product.

It is also within the scope of my process to add the coagulating agent to the polymerization reaction mixture initially, or at any time during the polymerization, to coagulate the polymer as it is formed. The amount of coagulating agent used in this manner, if any, is the same as the amount of oxidising agent mentioned above.

My invention can be illustrated by the following examples which, however, should not be construed as limiting the invention as described above.

EXAMPLE I

A mixture of 0.6 g. sodium tetraborate $(Na_2B_4O_7 \cdot 10H_2O)$ and 0.25 g. potassium persulfate ($K_2S_2O_8$) was charged to a 1-liter, stainless steel reactor equipped with cooling coils, stirrer and baffles. The reactor was sealed and flushed free of oxygen with five cycles of helium pressurizations to approximately 400 p.s.i.g. followed by venting to 0 p.s.i.g. Following the last venting to 0 p.s.i.g., 188 g. chlorotrifluoroethylene (CTFE) was charged to the reactor. Deoxygenated water, stored under helium pressure of 15 p.s.i.g., was pumped into the reactor until a volume of 400 ml. of water had been added. The contents of the reactor were stirred during the addition of water to facilitate dissolving the salts. Ethylene was pressured into the reactor to a reading of 340 p.s.i.g. before a solution of 0.125 g. sodium bisulfite in 10 ml. of deoxygenated water was syringed into the water inlet line of the reactor. The bisulfite solution was pumped into the reactor with an additional 200 ml. of water giving a total charge of 600 ml. water. The temperature of the reactor varied between 30 and 35° C. during the polymerization. By adjusting the ethylene pressure, the system was maintained at approximately 450–455 p.s.i.g. for a period of about 6 hours. The reactor was vented and opened to remove the precipitated polymer. The milky supernatant liquid was treated with a small amount of calcium nitrate to coagulate additional polymer. The combined polymer samples were washed two times in 300 ml. portions of deionized water in a Waring Blender. The polymer was filtered off and dried in an air oven at 145° C. The dried polymer weighed 115.1 g. which represents a yield of 460 g. polymer/g. $K_2S_2O_8$. Analysis showed that the polymer contained 26.6% chlorine which corresponds to a CTFE/$C_2H_4$ mole ratio of 1:0.786 (84 wt. percent CTFE, 16 wt. percent $C_2H_4$). A compression molded sample of polymer (ASTM D1143–65T) possessed the following properties:

| | |
|---|---|
| Flexural modulus, p.s.i.×$10^{-3}$ | 206 |
| Tensile break, p.s.i. | 6880 |
| Elongation, percent | 308 |
| Hardness, Shore D | 70 |

EXAMPLE II

A mixture of 0.8 g. sodium tetraborate $(Na_2B_4O_7 \cdot 10H_2O)$ and 0.25 g. potassium persulfate ($K_2S_2O_8$) was charged to a 1-liter, 316 stainless steel reactor equipped with cooling coils, stirrer and baffles. The reactor was flushed free of oxygen as described in Example I and charged with 193 g. chlorotrifluoroethylene (CTFE). The remainder of the procedure was as described in Example I except that the ethylene pressure was adjusted so that reactor pressure was maintained in the range of 800–1000 p.s.i.g. for a period of about 6 hours and the temperature varied between 28 and 49° C. The dried polymer isolated from this run weighed 85.9 g. which represents a yield of 343 g. polymer/g. $K_2S_2O_8$. Analysis showed that the polymer contained 24% chlorine which corresponds to a

CTFE/$C_2H_4$ mole ratio of 1:1.11 (79 wt. percent CTFE, 21 wt. percent $C_2H_4$). A compression molded sample of polymer (ASTM D1143–65T) possessed the following properties:

| | |
|---|---|
| Flexural modulus, p.s.i.×$10^{-3}$ | 158 |
| Tensile break, p.s.i. | 6180 |
| Elongation, percent | 492 |
| Hardness, Shore D | 67 |

Examples I and II show that the amount of ethylene incorporated into the copolymer is proportional to the ethylene pressure used in the run. It is to be noted that the polymer produced in Example II is nonflammable. The limiting oxygen index (L.O.I.) was found to be 0.346. This indicates that combustion of the polymer requires an atmosphere of 34.6% oxygen and 63.4% nitrogen.

EXAMPLE III

A run essentially identical to Example I *without* the addition of the sodium tetraborate buffer yielded a small amount of polymer. It was noted that the reaction mixture was slightly acidic. The run failed because the initiating free radical from a persulfate-sulfite couple cannot be generated in an acidic solution.

EXAMPLE IV

A 6 hour run was carried out using the persulfate alone as an initiator. The run was carried out to simulate the teaching of U.S. 2,392,378 which indicates catalysis by potassium persulfate. The data below show the advantage of using the persulfate-sulfite redox couple. A borate buffer was used in each of the (5–6 hour) runs.

TABLE IV

| Reference | Pressure, p.s.i.g. | Initiator | Grams CTFE charge | Grams CTFE/ $C_2H_4$ copolymer | Grams copolymer/ grams $K_2S_2O_8$ |
|---|---|---|---|---|---|
| Example I | 450 | $K_2S_2O_8$/$NaHSO_3$ | 188 | 115.1 | 460.4 |
| Example II | 1,000 | $K_2S_2O_8$/$NaHSO_3$ | 193 | 85.9 | 343.6 |
| Example IV | 700 | $K_2S_2O_8$ | 220 | 29.8 | 119.2 |

EXAMPLE V

The procedure of Example I was used except for the following differences: charged 217 g. CTFE and 45 g. propylene, and the system was maintained at 220–240 p.s.i.g. and 36–38° C. for a period of 22 hours. No copolymer was isolated from this run.

Reasonable variations and modifications of my invention will be apparent to those skilled in the art without departing from the spirit and scope thereof.

I claim:

1. A process for the copolymerization of ethylene and chlorotrifluoroethylene which comprises contacting a mixture of ethylene and chlorotrifluoroethylene wherein the ethylene comprises 5 to 95 weight percent of the copolymer with the remainder being chlorotrifluoroethylene in an aqueous polymerization system in the presence of a catalyst comprising
    (a) an oxidizing agent which is a water soluble alkali metal or alkaline earth metal salt of persulfuric acid or an ammonium salt or persulfuric acid,
    (b) a reducing agent which is ammonium or alkali metal sulfites, thiosulfites, thiosulfates, bisulfites, hydrosulfites, a formaldehyde sulfoxylate, and
    (c) a sufficient amount of a water soluble buffer compound to maintain the pH above 7 to about 12.

2. The process of claim 1 wherein the amount of (a) and the amount of (b) each is from about 0.05 to about 10 parts by weight per 100 parts of chlorotrifluoroethylene monomer charged.

3. The process of claim 1 wherein (a) is a water soluble ammonium or potassium salt of persulfuric acid.

4. The process of claim 1 wherein (c) is a water soluble compound which in the presence of (a) and (b) maintains the pH of the reaction mixture from 8 to 11.

5. The process of claim 1 wherein the amount of water employed is in the range of from about 25 to about 750 parts by weight per 100 parts of chlorotrifluoroethylene monomer charged.

6. The process of claim 1 wherein the catalyst system comprises
    (a) potassium persulfate,
    (b) sodium bisulfite, and
    (c) sodium tetraborate.

7. The process of preparing a copolymer of ethylene and chlorotrifluoroethylene wherein the ethylene comprises 5 to 95 weight percent of the copolymer with the remainder being chlorotrifluoroethylene which comprises charging to a sealed reactor an oxidizing agent which is a water soluble alkali metal, alkaline earth metal, or ammonium salt of persulfuric acid and a buffer compound which is capable of maintaining the pH of the reaction above 7 to about 12, adding to the reactor a sufficient amount of water to support the copolymerization, then adding to the reactor chlorotrifluoroethylene, pressurizing said reactor with ethylene to a pressure of from about 200–1000 p.s.i.g., and then adding to the reactor a reducing agent which is an ammonium or alkali metal sulfite, thiosulfite, bisulfite, hydrosulfite, or formaldehyde sulfoxylates, maintaining the temperature of the reactor in the range of from about 0° and 150° C. and continuing the polymerization until said copolymer has been formed.

8. The process of claim 7 wherein the copolymer is coagulated after polymerization has ceased by the addition of a coagulating agent which is calcium nitrate.

9. The process of claim 7 wherein the oxidizing agent is potassium persulfate, the buffer compound is sodium tetraborate, and the reducing agent is sodium bisulfite.

10. The process of claim 7 wherein the ethylene pressure is maintained at relatively constant value throughout the polymerization.

References Cited

UNITED STATES PATENTS

| 2,392,378 | 1/1946 | Hanford | 260—80 |
| 2,393,967 | 2/1946 | Brubaker | 260—80 |
| 3,318,854 | 5/1967 | Honn et al. | 260—87.7 |
| 3,403,137 | 9/1968 | Andersen et al. | 260—87.5 |
| 3,468,858 | 9/1969 | Heiberger et al. | 260—87.5 |
| 3,501,446 | 3/1970 | Ragazzini et al. | 260—87.5 |

JOSEPH L. SCHOFER, Primary Examiner

S. M. LEVIN, Assistant Examiner